US009619211B2

(12) United States Patent
McCollum et al.

(10) Patent No.: US 9,619,211 B2
(45) Date of Patent: Apr. 11, 2017

(54) CODE SUGGESTION IN A SOFTWARE DEVELOPMENT TOOL

(75) Inventors: Lorelei M. McCollum, Arlington, MA (US); Steven F. Best, Groton, MA (US); Janice M. Girouard, Austin, TX (US); Timothy B. Snow, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1095 days.

(21) Appl. No.: 12/982,626

(22) Filed: Dec. 30, 2010

(65) Prior Publication Data

US 2012/0174061 A1   Jul. 5, 2012

(51) Int. Cl.
*G06F 9/44* (2006.01)

(52) U.S. Cl.
CPC .................................. *G06F 8/33* (2013.01)

(58) Field of Classification Search
CPC ................................................. G06F 8/33
See application file for complete search history.

(56) References Cited

U.S. PATENT DOCUMENTS

| 6,305,008 | B1 * | 10/2001 | Vaidyanathan ........... G06F 8/33 |
| | | | 707/999.104 |
| 7,475,391 | B2 * | 1/2009 | Bustelo et al. ............... 717/138 |
| 7,562,344 | B1 * | 7/2009 | Allen et al. ................... 717/113 |
| 7,607,066 | B2 | 10/2009 | Gertz et al. |
| 8,234,561 | B1 * | 7/2012 | Bourdev ....................... 715/224 |
| 8,266,594 | B2 * | 9/2012 | Balasubramanian ......... 717/125 |
| 2004/0003335 | A1 | 1/2004 | Gertz et al. |
| 2004/0153995 | A1 * | 8/2004 | Polonovski ................... 717/113 |
| 2006/0090154 | A1 * | 4/2006 | Bustelo et al. ............... 717/110 |
| 2008/0270981 | A1 * | 10/2008 | Hutchison et al. ........... 717/110 |
| 2008/0320438 | A1 * | 12/2008 | Funto et al. ................... 717/106 |
| 2009/0254880 | A1 * | 10/2009 | Gryko et al. ................. 717/109 |
| 2009/0313597 | A1 * | 12/2009 | Rathbone et al. ............ 717/100 |

(Continued)

OTHER PUBLICATIONS

Marcel Bruch, Eclipse Code Recommenders, [Online] Oct. 29, 2010, [Retrieved from the Internet] <http://code-recommenders.blogspot.com/search?updated-max=2010-11-10T21:37:00%2B01:00&max-results=5&start=20&by-date=false> 16 pages.*

(Continued)

*Primary Examiner* — Geoffrey ST Leger
(74) *Attorney, Agent, or Firm* — Steven M. Greenberg, Esq.; CRGO Law

(57) ABSTRACT

Embodiments of the present invention provide a method, system and computer program product for the automated suggestion of code usage patterns in an IDE. In an embodiment of the invention, a method for automated suggestion of code usage patterns in an IDE is provided. The method includes receiving input of a code snippet for a source code file of a software development project loaded into memory of a host computer for display through an IDE. The method further includes matching terms of the received input to terms in different blocks of code in different source code files of the software development project. The method yet further includes selecting one of the different blocks of code as a code completion choice for insertion into the source code file in the IDE. Finally, the method includes inserting the selected one of the different blocks of code into the source code file in the IDE.

7 Claims, 1 Drawing Sheet

(56) References Cited

U.S. PATENT DOCUMENTS

2010/0017790 A1* 1/2010 Hutchison ............... G06F 8/33
717/136
2010/0050160 A1* 2/2010 Balasubramanian ..... G06F 8/33
717/126

OTHER PUBLICATIONS

Lars Vogel, Eclipse: Filter / Exclude certain packages during "Organize Imports", [Online] Apr. 1, 2009, [Retrieved from the Internet] <http://www.vogella.com/blog/2009/04/01/eclipse-organize-imports-filted> 2 pages.*

Bruch et al., Learning from examples to improve code completion systems, [Online] Proceedings the European software engineering conference and the ACM SIGSOFT symposium on The foundations of software engineering 2009, [Retrieved from the Internet] <http://delivery.acm.org/10.1145/1600000/1595728/p213-bruch.pdf> 10 pages.*

Hou, D., et al., Towards a better code completion system by API grouping, filtering, and popularity-based ranking, Proceedings of the 2nd International Workshop on Recommendation Systems for Software Engineering, May 2010, 5 pages, [retrieved on Sep. 6, 2016], Retrieved from the Internet: <URL:http://dl.acm.org/>.*

Holmes, R., et al., Using Structural Context to Recommend Source Code Examples, Proceedings of the 27th International Conference on Software Engineering, 2005, 9 pages, [retrieved on Sep. 13, 2016], Retrieved from the Internet: <URL:http://ieeexplore.ieee.org/>.*

Mooty, M., et al., Calcite: Completing Code Completion for Constructors Using Crowds, 2010 IEEE Symposium on Visual Languages and Human-Centric Computing (VL/HCC), 2010, 8 pages, [retrieved on Sep. 13, 2016], Retrieved from the Internet: <URL:http://ieeexplore.ieee.org/>.*

* cited by examiner

CODE SUGGESTION IN A SOFTWARE DEVELOPMENT TOOL

BACKGROUND OF THE INVENTION

Field of the Invention

The present invention relates to software development and more particularly to code completion in an integrated development environment (IDE) of a software development tool.

Description of the Related Art

Software development has evolved from the primitive specification of program code on punch cards to a source code file driven compilation and build workflow. Early, simplistic software development projects involved a single developer coding to a specification on a single development computer using a text editor to access a source code file and separate compile and build programs processing the source code file into an executable binary. As the complexity of the computer program grew in parallel to the growth of computing power, software development evolved into a multi-developer endeavor requiring sophisticated source code management and debugging tools to corral and coordinate the efforts of the developers.

Principal to the modern software development workflow is the integrated development environment (IDE). Initially introduced as the primary user interface to a particular coding language such as the venerable PASCAL or ubiquitous C++ and Java programming languages, the IDE has morphed into its own stand-alone computing product and now, is more akin to a high end word processor coupled to a document management enterprise system rather than a user interface to a hodge-podge of coding and debugging tools. To wit, central to the IDE of many advanced development tools is the inclusion of an auto-completion feature.

Auto-completion of source code is also known as code completion. The auto-complete feature involves the prediction of a word or phrase intended to be input by a user without the user actually typing the word or phrase completely. This feature is effective when it is easy to predict the word being typed based upon those words already typed, such as when there are a limited number of possible or commonly used words. In a source code editor auto-complete is greatly simplified by the regular structure of the programming languages. There are usually only a limited number of words meaningful in the current context or namespace, such as names of variables and functions.

Generally an auto-completion feature involves a display of a pop-up list of possible completions for the currently input prefix to allow the user to choose the right one. This is particularly useful in object-oriented programming because often the programmer will not know exactly what members a particular class has. Therefore, auto-complete then serves as a form of convenient documentation as well as an input method. In any event, while auto-complete is effective for recalling a class once a portion of the classname has been provided, auto-complete will not be helpful in the circumstance where the class name is completely unknown to the end user.

BRIEF SUMMARY OF THE INVENTION

Embodiments of the present invention address deficiencies of the art in respect to auto-completion in an IDE and provide a novel and non-obvious method, system and computer program product for the automated suggestion of code usage patterns in an IDE. In an embodiment of the invention, a method for automated suggestion of code usage patterns in an IDE is provided. The method includes receiving input of a code snippet for a source code file of a software development project loaded into memory of a host computer for display through an IDE. The method further includes matching terms of the received input to terms in different blocks of code in different source code files of the software development project. The method yet further includes selecting one of the different blocks of code as a code completion choice for insertion into the source code file in the IDE. Finally, the method includes inserting the selected one of the different blocks of code into the source code file in the IDE.

In one aspect of the embodiment, the method also includes loading into the IDE a particular one of the different source code files corresponding to the selected one of the different blocks of code, and visually emphasizing in the IDE the selected one of the different blocks of code in the particular one of the different source code files. In another aspect of the embodiment, the method further includes determining a popularity of use for each of the different blocks of code, and displaying each determined popularity in the IDE in connection with a corresponding one of the different blocks of code. In yet another aspect of the embodiment, the method further includes identifying an import directive in the code snippet, further identifying in the different blocks of code other import directives, and displaying in the IDE a list of the other import directives as import directives frequently used in concert with the identified import directive.

In another embodiment of the invention, a software development data processing system can be configured for automated suggestion of code usage patterns in an IDE. The system can include a host computer with at least one processor and memory, an IDE executing in the memory of the host computer and a software development project selected for editing in the IDE and a source code file of the software development project loaded in the memory and displayed in the IDE. A code suggestion module can be coupled to the IDE. The module can include program code enabled to receive input of a code snippet for the source code file, to match terms of the received input to terms in different blocks of code in different source code files of the software development project, to select one of the different blocks of code as a code completion choice for insertion into the source code file in the IDE, and to insert the selected one of the different blocks of code into the source code file in the IDE.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for automated suggestion of code usage patterns in an IDE. In accordance with an embodiment of the invention, multiple lines of source code in a source code file of a development project can be received in an IDE. The lines of source code can be compared to other lines of code already included in other portions of source code in other source code files of the development project. Thereafter, multiple different lines of source code including portions partially matching the compared lines of code can be displayed in the IDE as a code suggestion. In this way, auto-completion can be performed for source code even if the end user is not aware of the name of a class.

Figure 1:
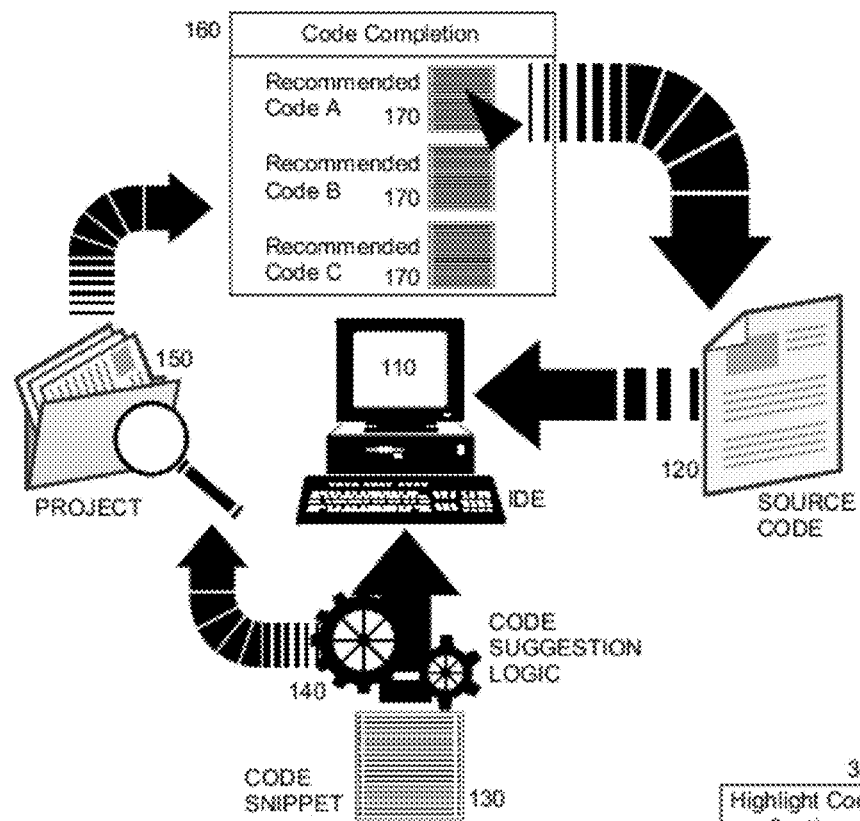
FIG. 1 is a pictorial illustration of a process for automated suggestion of code usage patterns in an IDE.

In further illustration, FIG. 1 pictorially shows a process for automated suggestion of code usage patterns in an IDE. As shown in FIG. 1, source code 120 for a software development project 150 can be loaded into an IDE 110 for a software development tool. A code snippet 130 can be input into the IDE 110 for the source code 120 and can include several different programmatic terms. Code suggestion logic 140 can compare the terms of the code snippet 130 to source code in multiple different source code files of the software development project 150 to identify terms in the multiple different source code files that match or are similar to the terms of the code snippet 130. Blocks of source code 170 in the software development project 150 that include the identified terms can be presented in a code completion dialog 160 as suggested code blocks to be incorporated into the source code 120.

Upon automatic or manual selection of one of the blocks of source code 170 in the code completion dialog 160, the selected one of the blocks of source code 170 can be inserted into the source code 120. Alternatively, upon selection of one of the blocks of source code 170 in the code completion dialog 160, a source code file in the project 150 including the selected one of the blocks of source code 170 can be loaded into the IDE 110 and the selected one of the blocks of source code 170 can be highlighted in the loaded source code file. Of note, the blocks of source code 170 can be ordered in the code completion dialog 160 according to popularity of use by other developers in other source code files of the project 150. Further, to the extent that the code snippet 130 includes an import directive for one imported object, other objects that have been imported in the project 150 in connection with the code snippet 130 can be recommended in the code completion dialog 160.

Figure 2:
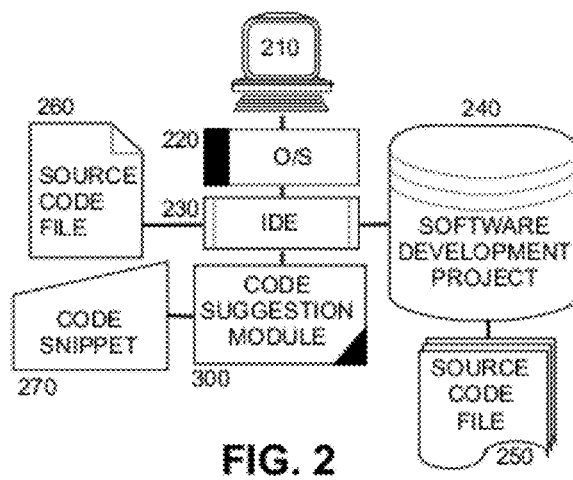
FIG. 2 is a schematic illustration of a software development data processing system configured for automated suggestion of code usage patterns in an IDE; and, FIG. 3 is a flow chart illustrating a process for automated suggestion of code usage patterns in an IDE.

The process described in connection with FIG. 1 can be implemented in a software development data processing system. In more particular illustration, FIG. 2 schematically shows a software development data processing system configured for automated suggestion of code usage patterns in an IDE. The system can include a host computer 210 with at least one processor and memory supporting the execution of an operating system 220. The operating system 220 in turn can host the operation of an IDE 230 for a software development tool. The IDE 230 can be coupled to a repository of source code files 250 for a development project 240 and at least one source code file 260 of the project 240 can be loaded into memory of the host computer 210 for manipulation in the IDE 230.

Importantly, a code suggestion module 300 can be coupled to the IDE 230. The code suggestion module 300 can include program code that when executed in the host computer 210 can be enabled to process a code snippet 270 input into the IDE 230 for the source code file 260 by locating portions of source code in the source code files 250 of the project 240 that include common or similar terms to those of the code snippet 270. The different located portions of the source code can be presented in the IDE 230 as different suggestions of blocks of code to be included in the source code file 260 in response to the input of the code snippet 270. Optionally, an indication of popularity of use of the different suggestions can be provided in concert with the display of the different suggestions in the IDE 230. Yet further, as another option, the selection in the IDE 230 of one of the different suggestions can result in the loading in the IDE 230 of a given one of the source code files 250 and the highlighting of the block of code in the given one of the source code files 250 corresponding to the selected one of the different suggestions.

Figure 3:
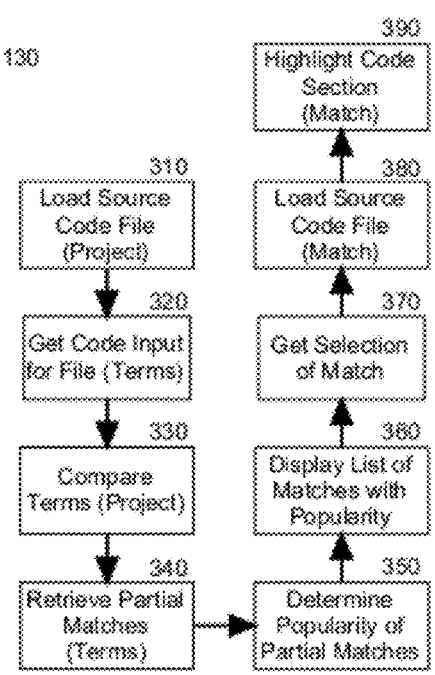

In even yet further illustration of the operation of the code suggestion module 300, FIG. 3 is a flow chart illustrating a process for automated suggestion of code usage patterns in an IDE. Beginning in block 310, a source code file for a software development project can be loaded into an IDE and in block 320, input of a code snippet for the source code can be received. In block 330, terms of the code snippet can be compared to blocks of source code in different source code files for the software development project. In block 340, different matches of blocks of source code can be determined to include one or more of the terms of the code snippet and, optionally, the popularity of past use of those matching blocks of source code can be determined, as illustrated in block 350.

In block 360, a list of the blocks of source code can be rendered in the IDE along with a corresponding indication of popularity of use for each of the blocks of source code. Subsequently, in block 370 a selection of one of the blocks of source code can be received. In response to the selection of one of the blocks of source code, in block 380 a source code file including the selected one of the blocks of source code can be loaded into the IDE and in block 390, the selected one of the blocks can be visually distinguished in the loaded source code.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. With specific reference to a computer readable storage medium, it is to be understood that a storage medium excludes transitory media such as transitory signals and other propagation media.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Having thus described the invention of the present application in detail and by reference to embodiments thereof, it will be apparent that modifications and variations are possible without departing from the scope of the invention defined in the appended claims as follows:

We claim:

1. A method for automated suggestion of code usage patterns in an integrated development environment (IDE), the method comprising:
    receiving input of a code snippet for a source code file of a software development project loaded into memory of a host computer for display through an IDE, the code snippet being a portion of source code of the source code file and the software development project including a plurality of source code files created by a plurality of developers, the plurality of developers coordinated to develop a computer program;
    matching terms of the received input to terms in different blocks of code in different source code files of the software development project;
    determining a popularity of use for each of the different blocks of code according to the popularity of use by other developers;
    displaying an indication of each determined popularity in the IDE and also a list of the different blocks of code corresponding with the indication;
    selecting automatically or manually one of the different blocks of code as a code completion choice for insertion into the source code file in the IDE; and,
    inserting the selected one of the different blocks of code into the source code file in the IDE.

2. The method of claim 1, further comprising:
    loading into the IDE a particular one of the different source code files corresponding to the selected one of the different blocks of code; and,
    visually emphasizing in the IDE the selected one of the different blocks of code in the particular one of the different source code files.

3. The method of claim 1, further comprising:
    identifying an import directive in the code snippet;
    further identifying in the different blocks of code other import directives; and,
    displaying in the IDE a list of the other import directives as import directives frequently used in concert with the identified import directive.

4. A software development data processing system configured for automated suggestion of code usage patterns in an integrated development environment (IDE), the system comprising:
    a host computer with at least one processor and memory;
    an IDE executing in the memory of the host computer;
    a software development project selected for editing in the IDE and a source code file of the software development project loaded in the memory and displayed in the IDE, the software development project including a plurality of source code files created by a plurality of developers, the plurality of developers coordinated to develop a computer program; and,
    a code suggestion module coupled to the IDE, the module comprising program code enabled to receive input of a code snippet for the source code file, the code snippet being a portion of source code of the source code file, to match terms of the received input to terms in different blocks of code in different source code files of the software development project, to determine a popularity of use for each of the different blocks of code according to the popularity of use by other developers, to display an indication of each determined popularity in the IDE and also a list of the different blocks of code corresponding with the indication, to select one of the different blocks of code as a code completion choice for insertion into the source code file in the IDE, and to insert the selected one of the different blocks of code into the source code file in the IDE.

5. A computer program product for automated suggestion of code usage patterns in an integrated development environment (IDE), the computer program product comprising:
    a computer readable storage medium having computer readable program code embodied therewith, the computer readable program code comprising:
    computer readable program code for receiving input of a code snippet for a source code file of a software development project loaded into memory of a host computer for display through an IDE, the code snippet being a portion of source code of the source code file and the software development project including a plurality of source code files created by a plurality of developers, the plurality of developers coordinated to develop a computer program;
    computer readable program code for matching terms of the received input to terms in different blocks of code in different source code files of the software development project;
    computer readable program code for determining a popularity of use for each of the different blocks of code according to the popularity of use by other developers;
    computer readable program code for displaying an indication of each determined popularity in the IDE and also a list of the different blocks of code corresponding with the indication;
    computer readable program code for selecting automatically or manually one of the different blocks of code as a code completion choice for insertion into the source code file in the IDE; and,
    computer readable program code for inserting the selected one of the different blocks of code into the source code file in the IDE.

6. The computer program product of claim 5, further comprising:
    computer readable program code for loading into the IDE a particular one of the different source code files corresponding to the selected one of the different blocks of code; and,
    computer readable program code for visually emphasizing in the IDE the selected one of the different blocks of code in the particular one of the different source code files.

7. The computer program product of claim 5, further comprising:
    computer readable program code for identifying an import directive in the code snippet;
    computer readable program code for further identifying in the different blocks of code other import directives; and,
    computer readable program code for displaying in the IDE a list of the other import directives as import directives frequently used in concert with the identified import directive.

* * * * *